United States Patent [19]

Canino

[11] 4,339,814

[45] Jul. 13, 1982

[54] SPINDLE ASSEMBLY FOR A VIDEO RECORDER-PLAYBACK MACHINE

[75] Inventor: Lawrence S. Canino, Torrance, Calif.

[73] Assignee: Discovision Associates, Costa Mesa, Calif.

[21] Appl. No.: 198,695

[22] Filed: Oct. 20, 1980

[51] Int. Cl.³ .......................... F16C 32/06; G11B 3/36
[52] U.S. Cl. ..................................... 369/261; 369/269
[58] Field of Search ................................ 369/261, 269

[56] References Cited

U.S. PATENT DOCUMENTS 4,252,327  2/1981  Elliott ................................. 369/261

FOREIGN PATENT DOCUMENTS 2319825  10/1973  Fed. Rep. of Germany ...... 369/269
1420322   1/1976  United Kingdom ................ 369/269

Primary Examiner—Steven L. Stephan
Attorney, Agent, or Firm—Ronald J. Clark

[57] ABSTRACT

A spindle assembly is provided for rotatably supporting and driving a video information disc in a video recorder-playback machine. The spindle assembly comprises a vertically extending journal having a generally truncated conical shape and supported for rotation in an inverted position within a complementary shaped spindle housing. Pressurized air is supplied through a plurality of slotted flow paths to the support interface between the journal and the spindle housing for supporting the journal for relatively high speed rotation on a cushion of air.

21 Claims, 6 Drawing Figures

SPINDLE ASSEMBLY FOR A VIDEO RECORDER-PLAYBACK MACHINE

BACKGROUND OF THE INVENTION

This invention relates generally to improvements in video recorder-playback machines, and more specifically, to an improved rotatable drive spindle assembly for smooth relatively high speed rotation of a video information disc in a video recorder-playback machine.

Video recorder-playback machines in general are known in the art and include appropriate means for recording and/or playing back a video information signal utilizing a selected medium for storage of the signal. For example, in one type of machine, the video signal is recorded magnetically for storage and/or retrieval upon a length of so-called video tape. In another type of system, the video signal is recorded upon an information disc for retrieval by means of a stylus, in a manner generally analogous to that of sound reproduction from phonographic records. In still another type of system, the video signal is used to frequency modulate a beam of amplified light, such as a laser beam, with sufficient power for physically altering the surface characteristics of a light sensitive coating on a video information disc and thereby record the signal upon the disc. During playback, a lower power light beam is reflected from the disc and the resulting signal is demodulated to reproduce the recorded signal. In all of these types of systems, the video information signal can be combined with an appropriate audio signal for either recording or playback purposes to yield a composite audio-video signal of the type commonly used for television transmissions and the like. For convenience, however, the signal will be referred to herein as a video information signal.

Video recorder-playback machines utilizing amplified light beams for recording and playback purposes offer significant advantages in that all physical contact of the recording and playback elements with the storage medium, namely, the information disc, is avoided. This prevents wear and deterioration of the machine elements and the disc, resulting in a high quality stored video signal which can be played back repeatably over a long period of time with unimpaired video resolution.

In video recorder-playback machines using amplified light beams for signal recording and playback, the recording and playback optical beams are focused upon the video information disc by a focusing lens which traverses the span of the disc in a radial direction simultaneously with relatively high speed rotation of the disc. In this manner, a spiral pattern of closely spaced tracks is formed on the disc to represent the video information. For maximum storage capacity for each disc, together with maximum signal resolution, the information tracks are formed to have a narrow width such as on the order of about 0.5 microns, and the center-to-center spacing between radially adjacent tracks in the spiraling pattern is on the order of about 1.5 microns. Accordingly, to prevent cross talk between the tracks during recording and/or playback operation, it is imperative that the video information disc be rotatably driven about an accurate and consistent axis of rotation to avoid substantial radial eccentricities.

In the prior art, a variety of drive spindle assemblies have been proposed for rotatably driving the video information disc. However, many of these prior art proposals involve so-called direct drive arrangements wherein a rotatable spindle carrying the disc is rotatably driven through a mechanical connection by a high speed drive motor. These direct drive arrangements tend to impart undesired system vibrations from the motor to the spindle to cause relatively slight radial excursions of the spindle during rotation which in turn frequently results in cross talk during operation of the machine. Some attempts have been made to isolate the spindle from this system vibration by at least partially supporting the spindle upon an air bearing. However, these arrangements have not heretofore proven totally satisfactory for eliminating cross talk between tracks during operation.

The present invention overcomes the problems and disadvantages of the prior art by providing an improved spindle assembly for a video recorder-playback machine. The improved spindle assembly includes a rotatable spindle shaft carried for consistent and high speed rotation about a vertical axis for accurate driving of a video information disc.

SUMMARY OF THE INVENTION

In accordance with the invention, a spindle assembly is provided for rotatably supporting and driving a video information disc in a video recorder-playback machine. The spindle assembly supports the information disc for relatively high speed rotation, such as on the order of about 1800 rpm, with little or no radial eccentricities during rotation. In this manner, the spindle assembly accurately and precisely drives the information disc for consistently accurate recording and playback of video information within the narrowly spaced information tracks on the disc, without signal cross talk. Moreover, the spindle assembly is substantially friction free during rotation resulting in little or no vibration or wear of components.

The spindle assembly comprises a vertically extending spindle shaft having a lower end rotationally driven by a relatively high speed dc motor. The spindle shaft extends upwardly to define an upper portion including an upwardly presented shoulder for vertically supporting a video information disc and an upwardly projecting stud for reception through a central opening in the disc for locating the disc upon the spindle shaft. If desired, clamping means can be provided for locking engagement with the stud and clamping engagement with the disc for centering the disc upon the stud.

The spindle shaft also includes an intermediate portion comprising a rotatable journal having an inverted truncated conical shape. This journal is supported for rotation within a generally complementary-shaped spindle housing formed from a plurality of stacked sections separated by appropriately sized shims to insure close mating engagement between the journal and the spindle housing. Thus, the journal provides a relatively large bearing surface for supporting the spindle shaft against radial loads which could result in radial eccentricities during high speed rotation, and against downward axial thrust loads.

The spindle housing includes an inlet passage for communication of air under pressure to the interface between the journal and the bearing surface of the spindle housing. More specifically, appropriate vertically formed air passages in the spindle housing sections communicate the pressurized air without orificing to annular slots formed vertically adjacent the shims. The shims include radially inwardly open notches in pressure communication with the annular slot whereby the air under pressure is supplied annularly to the interface between the journal and the housing bearing surface at a plurality of vertically spaced locations along the height of the spindle assembly for smooth, accurate rotation of the journal on a cushion of air.

The spindle housing is fixed to a base ring which in turn suitably anchors the spindle assembly upon the recorder-playback machine. A thrust plate is desirably secured to the lower extent of the journal for rotation therewith in running engagement with the lower face of the base ring in order to provide a bearing surface to accommodate axially upwardly directed thrust loads. A portion of the pressurized air is communicated to the interface between the thrust plate and the base ring to provide a cushion of air therebetween.

Other features and advantages of the present invention will become apparent from the following detailed description, taken in conjunction with the accompanying drawings which illustrate by way of example the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, the present invention is embodied in a video recorder-playback machine 10 having suitable optical and electronic elements for recording and playback of video information from a video information disc 14. The information disc 14 is removably supported within the machine upon a spindle assembly 18 for controlled and accurate high speed rotation of the disc during the recording and playback operations. A clamp assembly 20 operates to clamp the disc 14 in a precisely centered position upon the spindle assembly 18 for accurate, high speed disc rotation without slippage.

The machine 10, including the spindle assembly 18 of this invention, comprises an improvement over the prior art in that the spindle assembly 18 is designed for consistent and accurate rotation of the information disc 14 with respect to the vertical axis of the spindle assembly at a relatively high rotational speed without substantial radial eccentricities. The spindle assembly 18 is relatively simple in design and assembly, and is consistently smooth running without significant vibration or undue wear of components. The spindle assembly 18 is thus uniquely adapted for use in a video recorder-playback machine 10 wherein consistent and accurate rotation of an information disc 14 is a prerequisite to avoid cross talk between information tracks on the disc.

Figure 1:
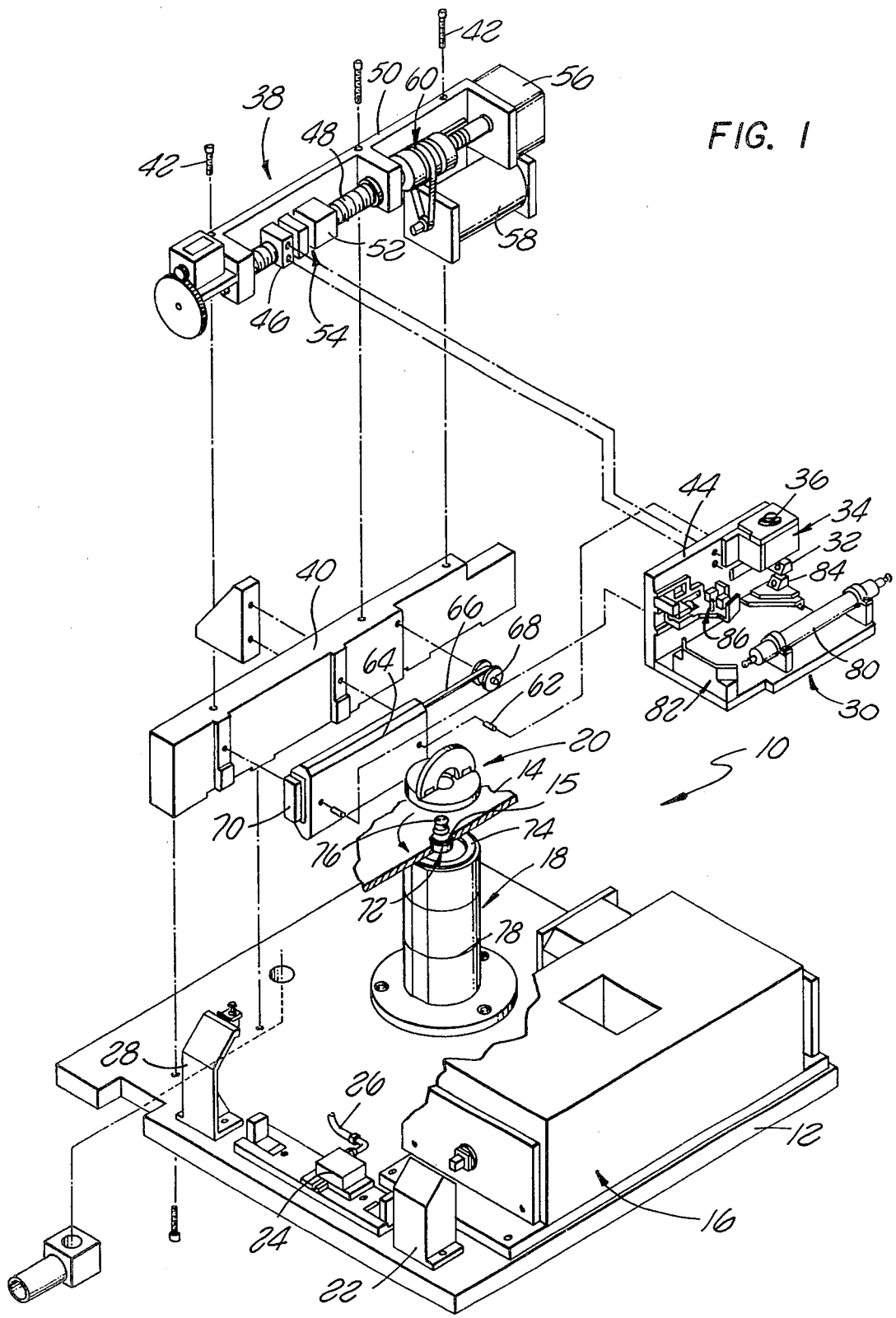
FIG. 1 is a fragmented perspective view illustrating, in partially exploded form, a video recorder-playback machine.

As shown in FIG. 1, the video recorder-playback machine 10 includes a machine base or table 12 which provides support for a relatively high power laser generator unit 16, such as an argon ion laser, for use in recording a prescribed video information signal upon the disc 14. The high power laser generator unit 16 emits a highly amplified collimated beam of light for redirection by a suitable mirror assembly 22 to an electronically driven modulator 24. The modulator 24 is driven by a suitable frequency modulated electronic signal supplied via an input lead 26 wherein the electronic signal is representative of the desired video information. The modulator 24 responds to the electronic signal to interrupt appropriately the amplified beam of light to pass a correspondingly modulated optical signal beam. This resultant optical signal beam is therefore representative of the prescribed video information. Conveniently, in many instances, the electronic signal comprises a composite audio-video signal of the type commonly used in television transmissions and which, when supplied to the modulator 24, yields an optical signal beam representative of the composite audio and video information. However, for sake of clarity and ease of description, all further reference herein will be to video information.

The modulated optical signal beam is incident upon a second mirror assembly 28 for redirection to a mobile optics carriage 30. This optics carriage 30 includes an angularly disposed dichroic mirror 32 for reflection of the optical signal beam in an upward direction for passage through an optical record-playback head 34. The record-playback head 34 carries an objective lens assembly 36 for focusing the optical signal beam to a precise spot on the underside of the video information disc 14.

The optics carriage 30 is movably positioned by a carriage drive assembly 38 along a path in a radial direction with respect to the disc 14. In this manner, the record-playback head 34 is movably positioned with respect to the disc 14 along a radius of the disc to control the point of focusing of the optical signal beam upon the disc. The carriage drive assembly 38 comprises a precision lead screw 48 supported for rotation by a bracket 50 which can be secured to a frame 40 and to the machine table 12 by a plurality of bolts 42. The lead screw 48 threadably receives a lead screw nut 52 coupled via a nonrotational coupling indicated at 54 to a sleeve-type push block 46 received freely about the lead screw 48. As illustrated, this push block 46 is secured to an upright wall 44 of the optics carriage 30.

The lead screw 48 is oriented in a direction parallel with the required radial direction of movement of the optics carriage 30. A relatively slow speed reversible motor 56 and a relatively high speed reversible motor 58 are connected to the lead screw 48 through a selective clutch unit 60, and this clutch unit is operated to control driving of the lead screw 48 about its own axis either at a relatively slow or relatively fast speed of rotation.

As illustrated in FIG. 1, the optics carriage 30 is driven by the lead screw 48 in a radially outward direction with respect to the disc 14 whenever the lead screw 48 is rotated to cause the lead screw nut 52 to push against the push block 46. When the lead screw is rotated in an opposite direction, the lead screw nut 52 travels along the screw in an opposite direction. To assure that the optics carriage 30 follows in the opposite, or radially inward direction, the carriage 30 is secured by pins 62 to a linear slide member 64 which is urged in the radially inward direction with respect to the disc 14 by a constant tension band spring 66 wound about a barrel 68 secured to the frame 40. The slide member 64 is slidably mounted on a linear track member 70 secured to the frame 40 and adapted to accommodate linear movement of the optics carriage 30 in both the radially inward and the radially outward directions.

For a more detailed description of the carriage drive assembly 38, see concurrently filed and copending U.S. application Ser. No. 198,696, entitled DRIVE ASSEMBLY FOR A VIDEO RECORDER-PLAYBACK MACHINE, which is incorporated by reference herein.

The video information disc 14 is received upon the spindle assembly 18 of this invention for relatively high speed rotation of the disc about the vertical axis of the spindle assembly 18, as will be described herein in more detail. This rotation of the disc occurs simultaneously with linear movement of the optics carriage 30 in response to operation of the carriage drive assembly 38. Thus, in operation, the optical signal beam is focused upon the underside of the video information disc 14 by the radially traversing record-playback head 34 on the optics carriage 30 simultaneously with high speed rotation of the disc. By appropriately controlling the relationship between radial traversal and rotational speed, the optical signal beam is focused upon the disc along a spiraling pattern of closely spaced tracks. Importantly, the disc 14 includes a photosensitive coating, such as a layer of thin metal or a photoresist material, adapted to be physically altered by the high power optical signal beam whereby the optical signal beam is physically recorded upon the disc as a pattern of discontinuities representative of the prescribed video information. In practice, the disc is rotated at a speed on the order of about 1800 rpm, and the closely spaced tracks are formed to have a width on the order of about 0.5 microns and a center-to-center spacing of about 1.5 microns.

The clamp assembly 20 is provided for clamping the video information disc 14 securely upon the spindle assembly 18 for accommodating the high speed rotation of the disc without slippage. Importantly, however, the clamp assembly also includes means for centering the disc upon the spindle assembly for accurate high speed rotation of the disc without substantial radial eccentricities with respect to the spindle assembly. While no specific clamp assembly construction is shown or described in detail herein, a preferred clamp assembly construction is set forth in concurrently filed and copending U.S. application Ser. No. 198,694, entitled CLAMP ASSEMBLY FOR A VIDEO RECORDER-PLAYBACK MACHINE, which is incorporated by reference herein.

As illustrated in FIG. 1, a relatively low power laser generator unit 80, such as a helium-neon laser, is mounted directly upon the optics carriage 30 for use in retrieving or playing back the recorded video information from the disc 14. This low power laser generator unit 80 emits an amplified and collimated beam of light for reflection off the disc 14 whereby the reflected optical beam comprises a modulated playback beam which is alternately reflected and nonreflected in accordance with the recorded video information. This modulated playback beam is of sufficiently low power to avoid physical alteration of the photosensitive coating on the disc 14.

The amplified beam of light from the low power laser generator unit 80 is redirected by a suitable mirror assembly 82 on the optics carriage 30 for appropriate incidence upon an angularly oriented mirror 84 which reflects the beam upwardly through the dichroic mirror 32 for focusing upon the disc 14 by the record-playback head 34. The reflected modulated playback beam is returned through the head 34 and by the mirror 84 to appropriate optical and electronic components 86 for demodulating the playback beam to the form of an electronic signal representative of the prescribed video information. This electronic signal can be supplied to an appropriate video display device, such as a television receiver, for playback of the recorded video information. Importantly, playback can occur independent of the recording function or substantially simultaneously with the recording function to serve as a check of the recording resolution.

Further details of the optical components of the recorder-playback machine 10 are described in concurrently filed and copending U.S. application Ser. No. 198,693, entitled VIDEO RECORDER-PLAYBACK MACHINE, and further specific details of the optical record-playback head 34 are described in concurrently filed and copending U.S. application Ser. No. 198,687, entitled LENS ASSEMBLY FOR A VIDEO RECORDER-PLAYBACK MACHINE, both of which are incorporated by reference herein.

The spindle assembly 18 of this invention is provided for supporting the information disc 14 for rotation about a precise vertical axis with significant radial eccentricities so as to allow accurate rotation of the disc with respect to the record-playback head 34. The spindle assembly 18 thus maintains the proper position of the disc during rotation with respect to the optical beams for precision recording and playback without cross talk between the closely spaced tracks.

The spindle assembly 18 is shown in detail in FIGS. 2-6, and comprises a vertically extending spindle shaft 72 supported for rotation about a precise vertical axis 71 within a complementary-shaped spindle housing 78. The spindle shaft 72 is formed from a unitary piece of stainless steel or the like, and is shaped to include a rod-shaped lower end 73 sized and shaped for reception downwardly into an electric drive motor 75 for driving the spindle shaft 72 at a relatively high rotational speed on the order of about 1800 rpm. Conveniently, in a preferred embodiment of the invention, this drive motor 75 comprises a high speed dc motor for applying a rotational torque to the lower end 73 of the shaft 72 without physical contact with the shaft. In this manner, the shaft is driven at the high rotational speed with minimum frictional resistance and minimum vibration between the motor 75 and the shaft 72.

Figure 2:
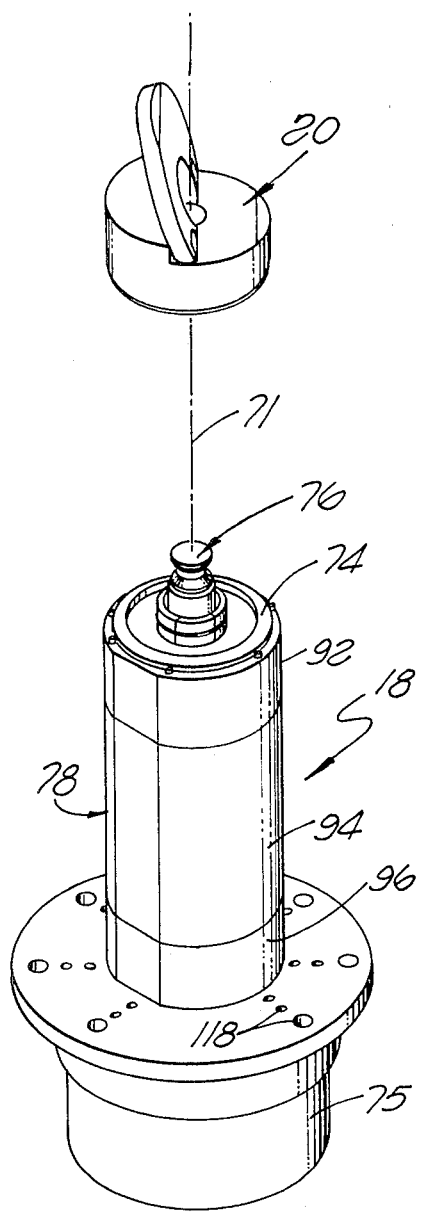
FIG. 2 is an enlarged perspective view, partially exploded, of the spindle assembly of this invention.
Figure 3:
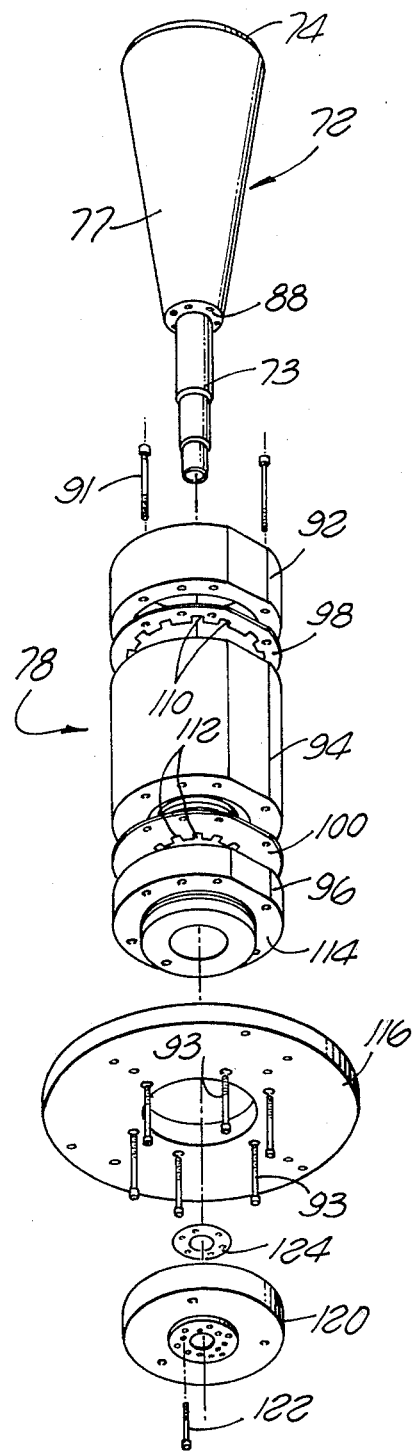
FIG. 3 is an enlarged perspective view in exploded form illustrating assembly of the spindle assembly of FIG. 2.

The lower end 73 of the shaft 72 merges upwardly into a journal 77 having a generally inverted and truncated conical shape for supportive engagement with the spindle housing 78. This journal 77 in turn is shaped to define an upwardly presented annular shoulder 74 for vertically supporting the information disc 14. An upper stud 76 projects upwardly from the journal 77 coaxially with the vertical axis 71 and is receivable through the central opening 15 of the information disc 14 for locating the disc upon the spindle assembly. As illustrated in FIGS. 1 and 2, this stud 76 is adapted for cooperation with the clamp assembly 20 for centering and clamping the disc in position.

The journal 77 of the spindle shaft 72 includes at its lower end an axially and downwardly presented shoulder 88. From the shoulder 88, the journal 77 extends upwardly and radially expands continuously over its height to define the truncated inverted conical shape. This conical journal 77 is received within the spindle housing 78 which includes a radially inwardly presented bearing surface 90 of a truncated conical configuration. Importantly, this housing bearing surface 90 is formed to correspond matingly with the journal 77 whereby the journal 77 is supported within the housing 78 for accurate rotation about the vertical axis 71. Importantly, the relative conical shapes of the journal 77 and the bearing surface 90 enable the journal to accommodate both radial loads and downwardly directed axial thrust loads during operation. Moreover, the major portion of the bearing surface area of the journal 77, namely, the larger diameter upper portion of the journal, is located at the top of the journal adjacent the major portion of the load to be supported by the journal, namely, the information disc 14 on the stud 76.

Figure 4:
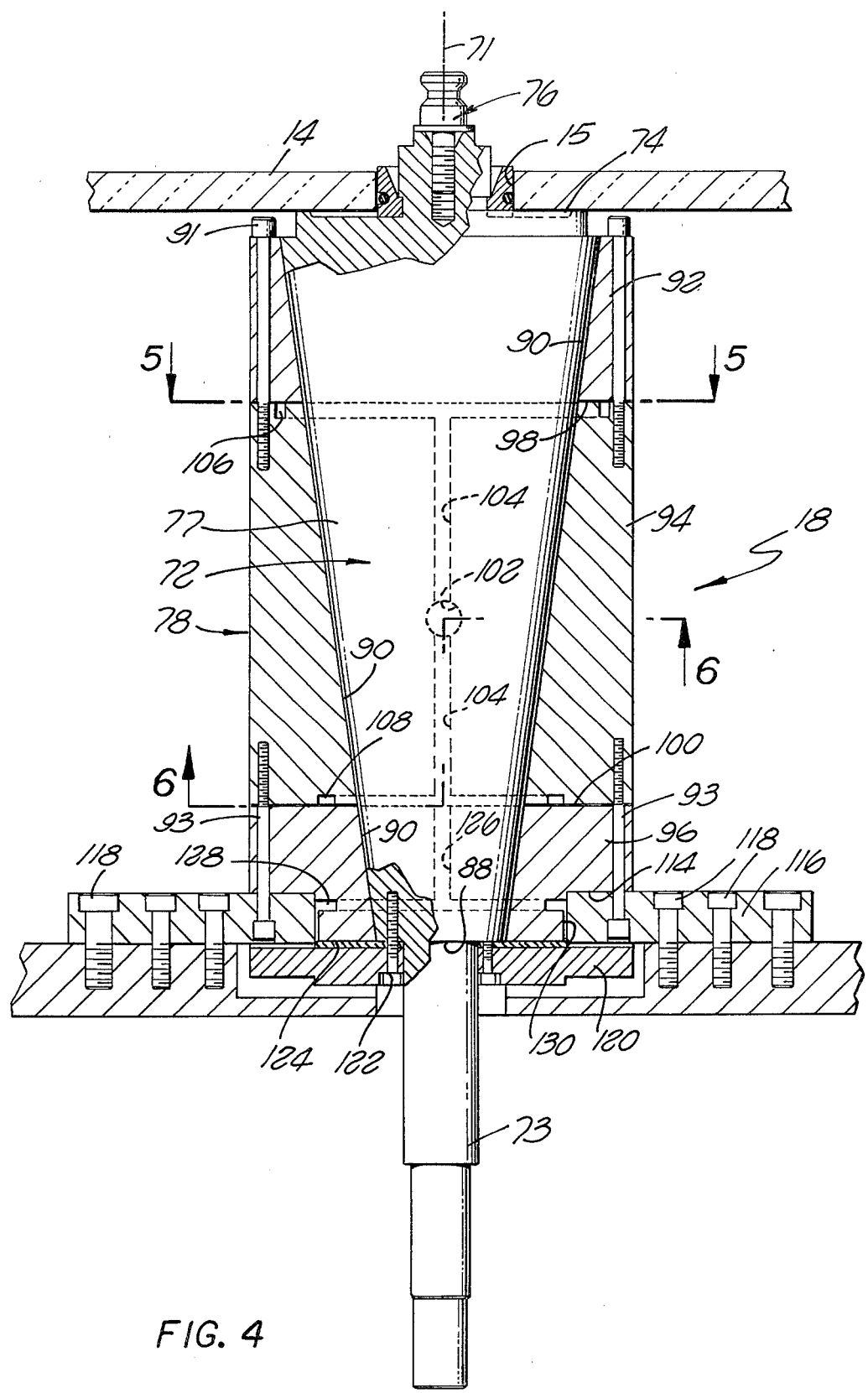
FIG. 4 is an enlarged fragmented elevation view of the spindle assembly, with portions broken away.

As shown best in FIG. 4, the spindle housing 78 is formed by a vertical stack of a plurality of housing sections, with three sections 92, 94, and 96 being illustrated in the drawing. These sections all include a radially inwardly presented bearing surface formed coaxially with the vertical axis 71 of spindle shaft rotation, and which, together with the corresponding bearing surfaces of the other housing sections, combine to define the conical bearing surface 90 for supporting the journal 77. Importantly, upper and lower ones 92 and 96 of the housing sections are respectively secured to the intermediate housing section 94 by a plurality of bolts 91 and 93.

A thin disc-shaped shim 98 is interposed between the upper and intermediate housing sections 92 and 94, and another thin disc-shaped shim 100 is interposed between the intermediate and lower housing sections 94 and 96. These shims 98 and 100 are appropriately sized and shaped to adjust the elevational positions between their respective housing sections so as to yield close conformance of the housing bearing surfaces 90 with the shape of the journal 77. Thus, accurate and constant rotation of the journal 77 about the vertical axis 71 is assured.

Figure 5:
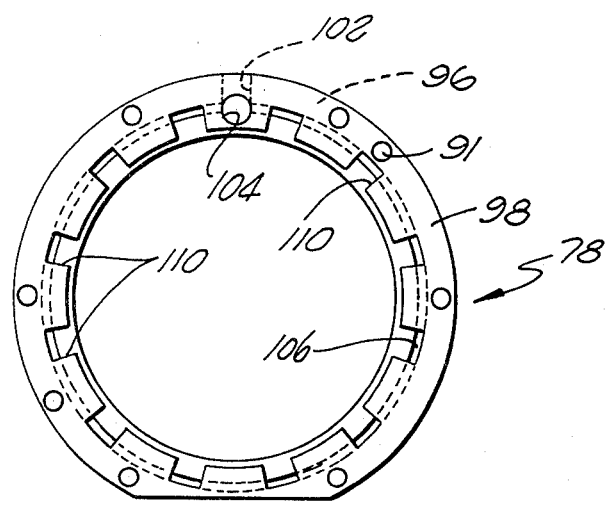
FIG. 5 is an enlarged vertical section taken on the line 5—5 of FIG. 4.
Figure 6:
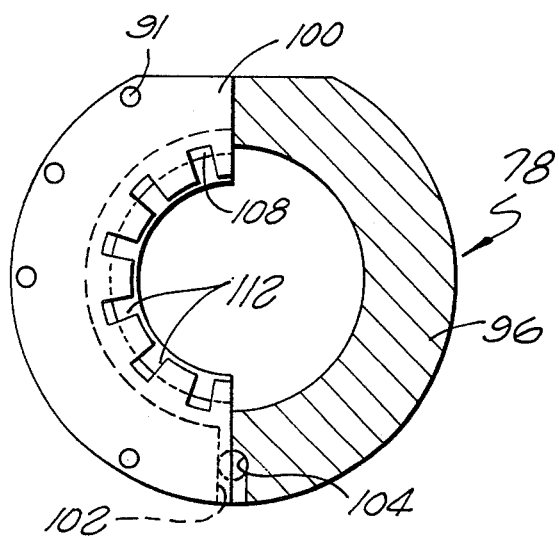
FIG. 6 is an enlarged vertical section taken on the line 6—6 of FIG. 4.

Pressurized air is communicated to the bearing interface between the journal 77 and the housing bearing surface 90 for smoothly supporting the journal for rotation upon a cushion of air. More specifically, as illustrated in FIGS. 4-6, the intermediate housing section 94 includes a radially projecting air inlet port 102 for suitable coupling to a supply (not shown) of air under pressure. This inlet port 102 supplies the air to an open flow riser 104 extending the height of the intermediate housing section 94. This flow path in turn openly communicates without orificing with an upwardly open slotted annular recess of flow path 106 at the upper end of the section 94, and with a downwardly open slotted annular recess or flow path 108 at the lower end of the section 94.

As shown in FIGS. 5 and 6, the two slotted recesses 106 and 108 are annularly positioned for open flow communication with a plurality of radially inwardly open notches 110 and 112 formed respectively in the adjacent shims 98 and 100. These notches 110 and 112 in the shims provide a plurality of flow paths for the air under pressure from the associated recesses 106 and 108 in a radially inward direction into direct communication with the interface between the journal 77 and the housing bearing surface 90. Thus, the pressurized air is supplied to the journal-bearing surface interface substantially uniformly about the journal and at a plurality of vertically spaced locations along the height of the journal. Importantly, to escape from the spindle assembly, this pressurized air is required to flow upwardly and downwardly along this interface whereby the journal is rotatably supported during operation by an annular and continuous film of air.

The lower housing section 96 of the spindle housing 78 includes a lower annular and recessed shoulder 114 for reception of a base ring 116. As shown, this base ring 116 is secured to the lower housing section 96 by the bolts 93, and is in turn secured to the machine table 12 by a plurality of bolts 118. In this manner, the spindle assembly 18 is securely fixed in position upon the machine.

A lower cylindrical thrust plate 120 is provided for accommodating vertically upward thrust loads upon operation of the spindle assembly 18. More specifically, this thrust plate 120 is secured to the downwardly presented shoulder 88 of the journal by a plurality of screws 122, preferably with an appropriately sized shim 124 interposed between the shoulder 88 and the thrust plate 120. This thrust plate is sized to include an upper bearing surface in running engagement with the underside of the base ring 116. Conveniently, as illustrated in FIG. 4, pressurized air is supplied to this bearing interface via a flow path 126 in the lower housing section 96 in alignment with the flow riser 104 in the intermediate housing section 94. This lower flow path 126 supplies a portion of the compressed air to an annular slot 128 which communicates via an annular leakage path 130 with the interface between the thrust plate 120 and the base ring 116.

The spindle assembly 18 of this invention thus provides a relatively simple and thereby relatively inexpensive assembly for accurately supporting a video information disc for accurate and smooth-running rotation about a precise vertical axis. The rotation of the spindle assembly is substantially friction free so as to isolate the information disc from machine and/or system vibrations which can otherwise create cross talk when the machine is operated in recording or playback modes.

The conical journal 77 rides on an air bearing surface to accommodate radial loads and axially downward thrust loads, and the thrust plate 120 rides on an air bearing surface to accommodate axially upward thrust loads. The pressurized air forming the air bearings is supplied without throttling or orificing through a plurality of internal flow paths and the slotted annular recesses formed within the spindle housing directly to the appropriate bearing surface. Importantly, the lack of orificing of the air prior to supply to the bearing surface yields substantially uniform air flow to all of the bearing surfaces to result in smooth vibration free spindle shaft rotation.

A variety of modifications and improvements to the spindle assembly for a video recorder-playback machine are believed to be apparent to one skilled in the art. Accordingly, no limitation on the invention is intended, except as set forth in the appended claims.

What is claimed is:

1. A spindle assembly for supporting a disc for rotation, comprising:
a spindle shaft including a generally truncated and inverted conical journal defining an upwardly presented shoulder for vertically supporting the disc, and a stud projecting upwardly from said shoulder along the axis of said journal for reception through a central opening formed in the disc;

a spindle housing formed to define a radially inwardly directed bearing surface of generally truncated conical shape for complementary and supporting reception of said journal for rotation of said journal about a vertical axis, said housing having passage means formed therein for communicating a substantially constant and annularly uniform flow of air under pressure to the conical bearing interface between said journal and said bearing surface; and said spindle housing is formed from a plurality of vertically stacked sections connected together to define said conical bearing surface; and including an annular shim for interposition between each adjacent pair of housing sections in the stack for elevationally adjusting said housing sections with respect to each other for adjusting said conical bearing surface to correspond closely with the shape of said journal.

2. The spindle assembly of claim 1 wherein said spindle shaft further includes a lower shaft portion projecting downwardly from said journal along the axis of said journal, and including motor means in association with said lower shaft portion for rotatably driving said spindle shaft.

3. The spindle assembly of claim 1 wherein said passage means formed in said spindle housing includes means for communicating a substantially constant and annularly uniform flow of air under pressure to the bearing interface between said journal and said bearing surface at a plurality of vertically spaced positions along the height of said journal.

4. The spindle assembly of claim 1 wherein said spindle housing includes a lower, axially downwardly presented bearing surface; and including a cylindrical thrust plate secured to the lower end of said spindle shaft for axially bearing engagement with said axially downwardly presented bearing surface on said housing.

5. The spindle assembly of claim 4 wherein said passage means formed in said spindle housing further includes means for communicating a substantially constant and annularly uniform flow of air under pressure to the bearing interface between said thrust plate and said axially downwardly presented bearing surface on said housing.

6. A spindle assembly for supporting a disc for rotation, comprising:

a spindle shaft including a generally truncated and inverted conical journal defining an upwardly presented shoulder for vertically supporting the disc, and a stud projecting upwardly from said shoulder along the axis of said journal for reception through a central opening in the disc;

a spindle housing including a plurality of housing sections arranged and connected together in a vertical stack, said housing sections combining to define a radially inwardly directed generally conical bearing surface for mating and supporting reception of said journal for rotation of said journal about a vertical axis, one of said housing sections of an adjacent pair of sections in the stack including an annular recess formed in its end and presented axially toward the other of said pair of sections, and passage means for communicating a substantially constant flow of air under pressure to said recess; and an annular shim between said adjacent pair of sections and including a plurality of radially inwardly open notches in axial flow communication with said recess and in radially inwardly open flow communication with the conical bearing interface between said journal and said bearing surface for supplying the air under pressure substantially uniformly and annularly to said conical bearing interface.

7. The spindle assembly of claim 6 wherein said spindle shaft further includes a lower shaft portion projecting downwardly from said journal along the axis of said journal, and including motor means in association with said lower shaft portion for rotatably driving said spindle shaft.

8. The spindle assembly of claim 6 wherein said spindle housing includes a lower, axially downwardly presented bearing surface; and including a cylindrical thrust plate secured to the lower end of said spindle shaft for axially bearing engagement with said axially downwardly presented bearing surface on said housing.

9. The spindle assembly of claim 8 wherein said passage means includes means for communicating a substantially constant and annularly uniform flow of air under pressure to the bearing interface between said thrust plate and said axially downwardly presented bearing surface on said housing.

10. A spindle assembly for supporting a disc for rotation, comprising:

a spindle shaft including a generally truncated and inverted conical journal defining an upwardly presented shoulder for vertically supporting the disc, and a stud projecting upwardly from said shoulder along the axis of said journal for reception through a central opening in the disc;

a spindle housing including at least three housing sections arranged and connected together in a vertical stack, said housing sections combining to define a radially inwardly directed generally conical bearing surface for mating and supporting reception of said journal for rotation of said journal about a vertical axis, the intermediate one of said housing sections including at its upper end an annular upwardly presented recess and at its lower end an annular downwardly presented recess, and passage means for communicating a substantially constant flow of air under pressure to said recesses;

a first annular shim between said intermediate section and the upper one of said sections, and including a plurality of radially inwardly open notches in flow communication with said upwardly presented recess and with the conical bearing interface for supplying air under pressure substantially uniformly and annularly to said conical bearing interface; and a second annular shim between said intermediate section and the lower one of said sections, and including a plurality of radially inwardly open notches in flow communication with said downwardly presented recess and with the conical bearing interface for supplying air under pressure substantially uniformly and annularly to said conical bearing interface.

11. The spindle assembly of claim 10 wherein said spindle shaft further includes a lower shaft portion projecting downwardly from said journal along the axis of said journal, and including motor means in association with said lower shaft portion for rotatably driving said spindle shaft.

12. The spindle assembly of claim 10 wherein said passage means formed in said intermediate section comprises an air inlet port, and a flow riser in communication with said port and extending vertically for communication with said recesses at the upper and lower ends of said intermediate section.

13. The spindle assembly of claim 12 wherein said spindle housing includes a lower, axially downwardly presented bearing surface; and including a cylindrical thrust plate secured to the lower end of said spindle shaft for axially bearing arrangement with said axially downwardly presented bearing surface on said housing.

14. The spindle assembly of claim 13 further including a flow path formed in said lower section in open communication with said riser, and an annular recess formed in said lower section in open communication between said flow path and the bearing interface between said thrust plate and said axially downwardly presented bearing surface on said housing.

15. In a video machine, a spindle assembly for supporting for rotation a video information disc having a central opening formed therein, comprising:
a spindle shaft including a generally truncated and inverted conical journal defining an upwardly presented shoulder for vertically supporting the disc, a stud of reduced cross section projecting upwardly from said shoulder along the axis of said journal for reception through the central opening in the disc, and a lower shaft portion projecting downwardly from said journal along the axis of said journal;
a spindle housing including at least three housing sections arranged and connected together in a vertical stack, said housing sections combining to define a radially inwardly directed generally conical bearing surface for mating and supporting reception of said journal for rotation of said journal about a vertical axis, the intermediate one of said housing sections including at its upper end an annular upwardly presented recess and at its lower end an annular downwardly presented recess, and passage means for communicating a substantially constant flow of air under pressure to said recesses;
a first annular shim between said intermediate section and the upper one of said sections, and including a plurality of radially inwardly open notches in flow communication with said upwardly presented recess and with the conical bearing interface for supplying air under pressure substantially uniformly and annularly to said conical bearing interface;
a second annular shim between said intermediate section and the lower end of said sections, and including a plurality of radially inwardly open notches in flow communication with said downwardly presented recess and with the conical bearing interface for supplying air under pressure substantially uniformly and annularly to said conical bearing interface;
a radially enlarged cylindrical thrust plate secured to the lower end of said journal about said lower shaft portion, said housing including an axially downwardly presented bearing surface for bearing engagement with said thrust plate; and
motor means in association with said lower shaft portion for rotatably driving said spindle shaft.

16. The spindle assembly of claim 15 including a flow path formed in said lower section in open communication with said passage means formed in said intermediate section, and an annular recess formed in said lower section in open communication between said flow path and the bearing interface between said thrust plate and said axially downwardly presented bearing surface on said housing.

17. A spindle assembly for supporting a disc for rotation, comprising:
a spindle shaft including a generally truncated and inverted conical journal defining an upwardly presented shoulder for vertically supporting the disc, and a stud projecting upwardly from said shoulder along the axis of said journal for reception through a central opening formed in the disc;
a spindle housing formed from a plurality of vertically stacked sections connected together to define a radially inwardly directed bearing surface of generally truncated conical shape for complementary and supporting reception of said journal for rotation of said journal about a vertical axis, said housing having passage means formed therein for communicating a substantially constant and annularly uniform flow of air under pressure to the conical bearing interface between said journal and said bearing surface, said passage means including an air inlet port in one of each adjacent pair of housing sections, an open flow riser in said one housing section and extending vertically in flow communication from said air inlet port to the end of said one housing section adjacent the other housing section, and an axially presented annular recess formed in the end of said one housing section in open communication with said riser; and
an annular shim for interposition between each adjacent pair of housing sections in the stack for elevationally adjusting said housing sections with respect to each other for adjusting said conical bearing surface to correspond closely with the shape of said journal, said shim being formed to include a plurality of radially inwardly open notches in axial communication with said annular recess for directing the air under pressure substantially uniformly and annularly to said conical bearing interface.

18. A spindle assembly for supporting a disc for rotation, comprising:
a spindle shaft including a generally truncated and inverted conical journal defining an upwardly presented shoulder for vertically supporting the disc, and a stud projecting upwardly from said shoulder along the axis of said journal for reception a central opening formed in the disc;
a spindle housing formed from at least three housing sections connected together in a vertical stack to define a radially inwardly directed bearing surface of generally truncated conical shape for complementary and supporting reception of said journal for rotation of said journal about a vertical axis, said housing having passage means formed therein for communicating a substantially constant and annuarly uniform flow of air under pressure to the conical bearing interface between said journal and said bearing surface, said passage means being provided in the form of an air inlet port in the intermediate one of said housing sections in open communication with an open flow riser extending vertically substantially the full height of said intermediate section, an annular upwardly presented recess in open communication with said flow riser at the upper end of said intermediate section, and an annular downwardly presented recess in open communication with said flow riser at the lower end of said intermediate section;
first means between said intermediate section and the upper one of said sections for directing air under pressure within said upwardly presented recess of flow substantially uniformly and annularly to said conical bearing interface; and second means between said intermediate section and the lower one of said sections for directing air under pressure within said downwardly presented recess to flow substantially uniformly and annularly to said conical bearing interface.

19. The spindle assembly of claim 18 wherein said first means and said second means each respectively comprise an annular shim having a plurality of radially inwardly open notches formed therein, said notches being positioned in axial communication with the associated one of said recesses formed in said intermediate section.

20. The spindle assembly of claim 18 wherein said inlet port, said riser, and said recesses formed in said intermediate section are formed for flow of the air under pressure without orificing.

21. A spindle assembly for supporting a disc for rotation, comprising:

a spindle shaft including a generally truncated and inverted conical journal defining an upwardly presented shoulder for vertically supporting the disc, and a stud projecting upwardly from said shoulder along the axis of said journal for reception through a central opening formed in the disc;

a spindle housing formed from a plurality of vertically stacked sections connected together to define a radially inwardly directed bearing surface of generally truncated conical shape for complementary and supporting reception of said journal for rotation of said journal about a vertical axis, said housing having passage means formed therein including an air inlet port in one of each adjacent pair of housing sections, an open flow riser in said one housing section and extending generally vertically in flow communication from said air inlet port to the end of said one housing section adjacent the other housing section, and an axially presentd annular recess formed in the end of said one housing section in open communication with said riser; and means interposed between said adjacent pair of housing sections for directing air under pressure within said axially presented annular recess to flow substantially uniformly and annulary to the conical bearing interface.

* * * * *